Nov. 12, 1957 DE WITT T. VAN ALEN 2,813,182
POTENTIOMETER ADJUSTER
Filed March 10, 1955 5 Sheets-Sheet 1

INVENTOR.
DE WITT T. VAN ALEN
BY
Wheeler, Wheeler & Wheeler
ATTORNEYS

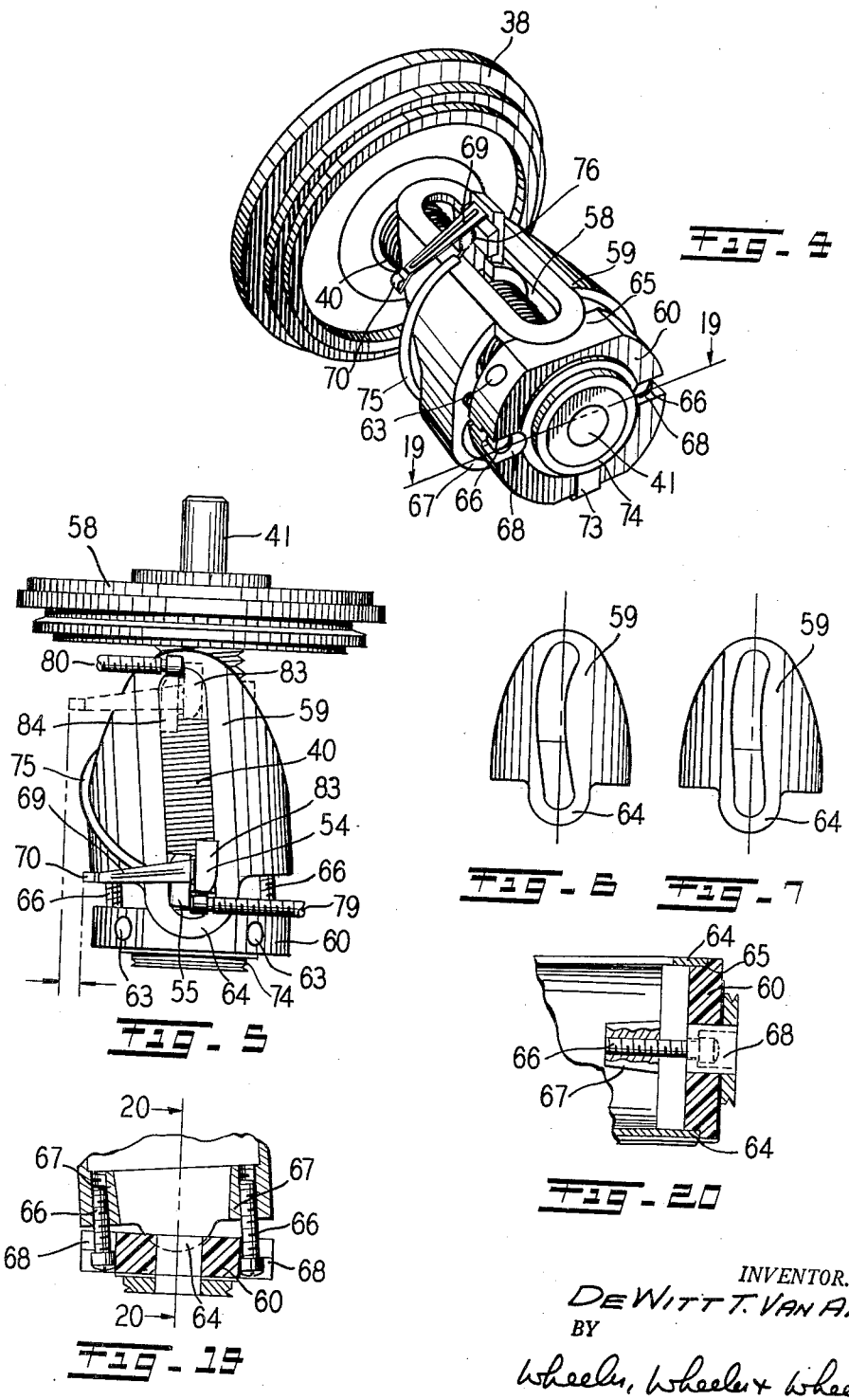

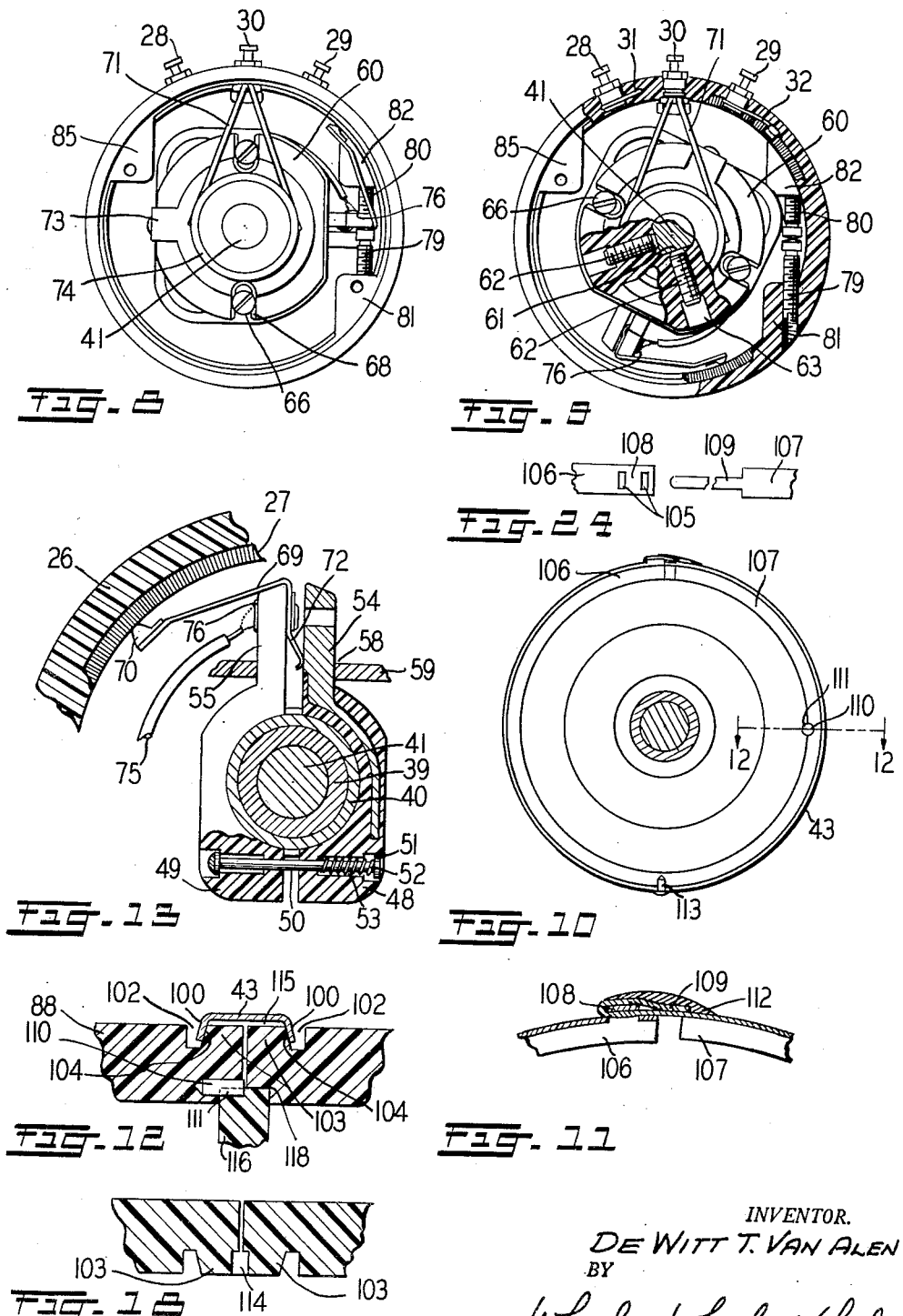

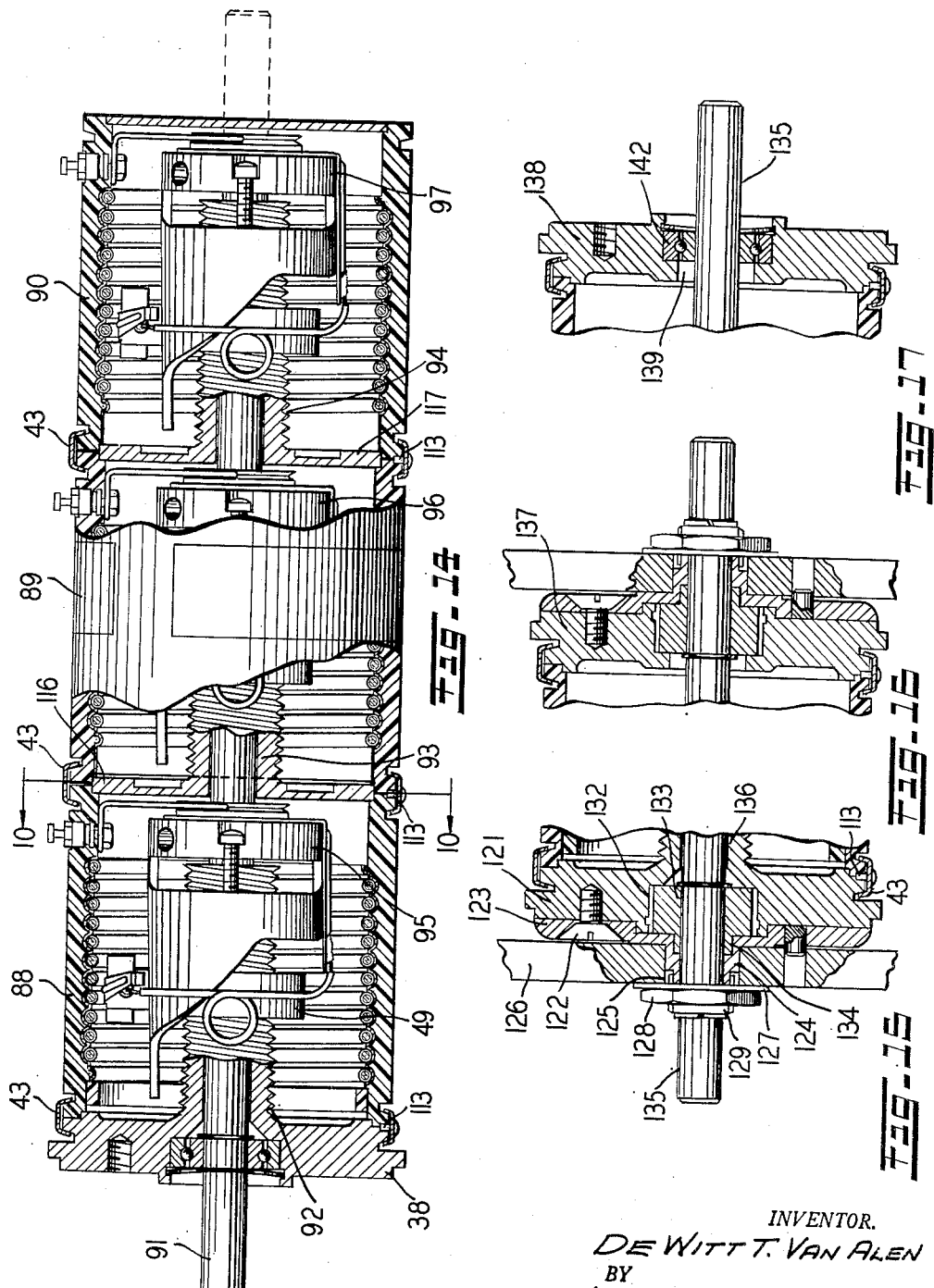

INVENTOR.
DE WITT T. VAN ALEN
BY
Wheeler, Wheeler & Wheeler
ATTORNEYS

United States Patent Office 2,813,182
Patented Nov. 12, 1957

2,813,182

POTENTIOMETER ADJUSTER

De Witt T. Van Alen, Delavan, Wis., assignor to The George W. Borg Corporation, Chicago, Ill., a corporation of Delaware Application March 10, 1955, Serial No. 493,479

22 Claims. (Cl. 201—56)

This invention relates to improvements in multiturn potentiometers of the type shown in my prior Patent No. 2,665,355.

An object of the present invention is to provide a potentiometer for the most exacting military and commercial applications requiring exceptionally precise and rugged apparatus.

The potentiometer of the present invention incorporates several features which improve it over prior art devices both mechanically and electrically. One of the most important features is a novel guide arm or fork mounted on the driver which rotates the contact carrier and which admits of ready adjustment of the angle through which the contact carrier is rotated with respect to the angle through which the driving shaft is rotated.

In prior art potentiometers known to me, alignment of the contact slider with the end terminal on the resistance helix was not commercially feasible in view of the manufacturing tolerances inherent in the construction of the apparatus. It is common in the art to use trimming resistances at one or both terminal ends of the resistance helix to adjust for the fact that in production line potentiometers the mechanical and electrical rotation is rarely the same and consequently the contact slider could not be positioned directly opposite the end terminal after the drive shaft has rotated through a predetermined angle. One way of equalizing mechanical and electrical rotation, and eliminating the trimming resistance aforesaid, is shown in my prior patent aforesaid.

The present invention, however, provides improved compensating means. The device of the present invention is particularly valuable because the guide arm or fork is adjustable to permit modification of the angle through which the contact slider rotates within any limited range desired.

The device of the present invention is also an improvement over prior art potentiometers known to me in that I provide adjustable stops or abutments at the end of the travel of the contact carrier. These stops facilitate accurate alignment of the contact slider with the resistance helix at points opposite its end terminals, at either or both ends of the helix. Accordingly, a potentiometer responding to the proposed absolute terminal linearity definition of the R. E. T. M. A. can be mass produced within normal manufacturing tolerances.

While the potentiometer of the present invention is particularly suited to adjust for absolute terminal linearity, it is so constructed that it may be modified at the option of the user to meet other linearity definitions. Absolute terminal linearity, of course, is the most stringent linearity requirement now specified. Accordingly, modification of my potentiometer to meet the less stringent requirements of other linearity definitions will normally not be resorted to.

The novel mechanical construction of my potentiometer facilitates coupling or ganging a plurality of potentiometers in end-to-end relationship for operation of their respective contact carriers from a single driving shaft.

Ganging of my potentiometers is made possible by unique provision for hollow lead screws in the respective potentiometers through which the common shaft extends. The hollow lead screw is also an integral part of the mounting disk or end closure of the potentiometer housing shell, thus to insure rigidity of the lead screw and to positively dispose it on the axis of the resistance helix. The integral structure aforesaid also promotes heat dissipation from within the potentiometer along the lead screw and its integral end disk to the panel on which the disk is mounted. When my potentiometers are ganged in the manner described, the individual potentiometers may be individually adjusted to respond to any linearity definition and to phase their contact carriers with their respective resistance helices.

Other objects, advantages and features of the invention will more fully appear from the detailed disclosure in which:

Fig. 4 is a perspective view of the end closure, integral lead screw, contact carrier and driver, in assembled relation but removed from the housing shell.

Fig. 5 is a plan view of the apparatus shown in Fig. 4.

Figs. 6 and 7 are plan views of modified embodiments of the fork and illustrating variations in the curve of the fork slot.

Fig. 8 is a rear end elevation of an assembled potentiometer according to my invention.

Fig. 9 is a view similar to that shown in Fig. 8, portions being broken away and shown in cross section.

Fig. 10 is an end view, partly in section, showing a coupling band connecting two potentiometers in end-to-end relationship and taken along the line 10—10 of Fig. 14.

Fig. 11 is a greatly enlarged fragmentary view, partly in cross section, taken through the coupling between the ends of the clamping band.

Fig. 12 is a greatly enlarged fragmentary cross section taken along the line 12—12 of Fig. 10.

Fig. 13 is a fragmentary cross section, partly in elevation, taken through the split nut contact carrier and also showing the relation between the contact slider and resistance helix.

Fig. 14 is an axial cross section, partly in elevation, showing a plurality of ganged potentiometers.

Fig. 15 is an enlarged cross section showing apparatus for mounting the potentiometer on a panel from the potentiometer end closure with which the lead screw is integral.

Fig. 16 is a fragmentary cross section showing apparatus for mounting the potentiometer from its opposite end closure.

Fig. 17 is a cross sectional view showing an end closure and drive shaft bearing in the end potentiometer of a coupled series.

Fig. 18 is an enlarged fragmentary cross sectional view at the junction of two coupled housing shells and showing the notched keying socket formed in the edges thereof.

Fig. 19 is a fragmentary cross sectional view taken along the line 19—19 of Fig. 4.

Fig. 20 is a fragmentary cross sectional view taken along the line 20—20 of Fig. 19.

Fig. 24 is a fragmentary view in spaced apart relation of the ends of the clamping ring used to couple adjacent housing shells in end-to-end relation.

In this description reference will be made to multi-turn potentiometers having ten turns in their resistance helices. Accordingly, for the respective contact sliders to move from one end to the other of their respective helices, the operating shafts are normally rotated through exactly ten revolutions or 3600°. In its broad aspects the invention is not limited to any particular number of turns in the resistance helix. The present invention is applicable to any multi-turn potentiometer, for example, a three-turn potentiometer.

Figure 1:
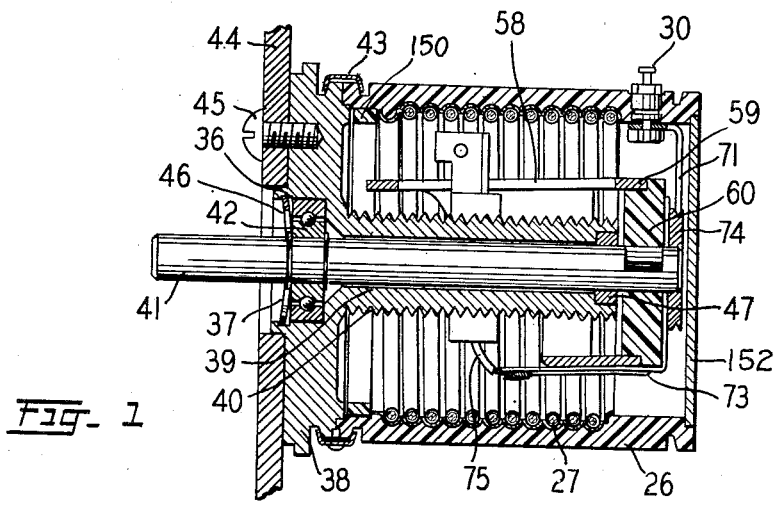
Fig. 1 is an axial cross sectional view taken through a potentiometer embodying my invention.

As best shown in Fig. 1, the potentiometer may comprise a plastic or other dielectric housing shell 26 in which a multi-turn resistance helix 27 is molded. The shell has end terminals 28, 29 (see Figs. 2, 8 and 9) for the resistance helix and a terminal 30 for the contact slider. Terminals 28 and 29 are provided with leads 31, 32 molded within the housing shell and connected to the ends of the resistance helix 27.

Figure 3:
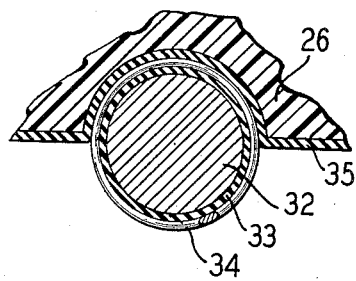
Fig. 3 is a greatly enlarged fragmentary cross sectional view taken through the resistance helix and portion of the housing shell thereabout.

As best shown in Fig. 3 the resistance helix may comprise a length of copper wire 32, wound into a helix, and having an insulated coating 33 about which the resistance wire 34 is helically wound. A lining 35 may intervene between the resistance helix and the housing. As the shell and helix are molded together, the helix and its terminals are fixed with respect to the shell.

One end of the housing shell 26 is closed by end closure 38 integrally provided with a hollow tube 39 on which screw threads 40 are provided, the threads being concentric with the resistance helix 27 and the hollow tube admitting a drive shaft 41 disposed on the axis of the resistance helix. The end closure 38 may be provided with a cavity for the ball bearing 42 on which the drive shaft 41 turns. The closure 38 is undercut at 36 to receive spring washer 37 which holds bearing 42 in position. The end closure 38 is coupled to the housing shell 26 by a clamping ring 43 hereafter described more in detail. The end closure may be mounted directly on a panel 44 by means of the screws 45 or the like. Shaft 41 projects through panel aperture 46 for connection thereto of a dial. The other end of the shaft is rotatably mounted in bushing 47 mounted at the end of tube 39.

The screw threads 40 mount the contact carrier which comprises the split nut shown in cross section in Fig. 13. The nut comprises complementary portions 48, 49 connected by means of the bolt 50 and nut 51. A tension spring 52 bears between the nut 51 and the bottom of socket 53 formed in portion 48 to tend to draw the portions 48, 49 together. Diametrically opposite the bolt 50, portions 48, 49 are provided with radial projecting arms 54, 55 which extend through the slot 58 of the driver fork 59.

The tension of spring 52 biases the arms 54, 55 against the margins of the fork about slot 58. Fork 59 is one part of a driver which includes a dielectric ring 60 secured to shaft 41 which has flattened sides 61 engaged by the set screws 62 as best shown in Fig. 9. The set screws 62 are received in the radial sockets 63 formed in the dielectric ring 60.

The fork 59 has upper and lower arcuately curved fulcrum or pivot portions 64 which are received in saddle shaped sockets 65 in the dielectric ring 60. Ring 60 is also provided with adjusting screws 66 mounted in ring sockets 68 and 90° offset from the fulcrums 65 of the fork. The fork is provided with inturned lugs 67 with threaded apertures engaged by the adjusting screws 66. By alternately tightening and loosening the respective screws 66 the fork may be pivoted about its fulcrum prtions 64 to misalign or cant the medial axis of fork slot 58 with respect to the axis of drive shaft 41. As best shown in Fig. 5, right-hand screw 66 has been loosened and left-hand screw 66 has been correspondingly tightened whereupon the fork 59 has been canted toward the left.

Rotation of drive shaft 41 drives ring 60 and fork 59 and the pressure of the margins of slot 58 against the radially projecting arms 54, 55 of the split nut will cause the nut to rotate on the fixed lead screw 40. If the fork 59 is aligned with the axis of drive shaft the nut will rotate identically with the drive shaft. If the fork is at an angle to the axis of drive shaft 41, as shown in Fig. 5, the rotation of the nut will be increased or decreased with respect to the rotation of the drive shaft depending on the direction of rotation. For counterclockwise rotation of the drive shaft 41 (in its Fig. 4 position) the nut will advance from its full line position shown in Fig. 5 to its dotted line position shown in Fig. 5. In the course of traverse of the contact carrier from one end of the lead screw to the other it will be angularly advanced by a few degrees in comparison with the angular rotation of the drive shaft, with the fork adjusted as shown in Fig. 5.

The radial arm 55 carries the contact slider 70 mounted on spring arm 69 riveted at 76 to arm 55. The slider 70 bears under tension of arm 69 on the resistance helix 27. The lead of screw 40 is substantially the same as the lead of the resistance helix 27. In actual practice the lead of screw 40 is made slightly different from the lead of helix 27 to shift the wear point on the slider as explained in my prior patent aforesaid. Accordingly, as the driver is rotated by shaft 41 the contact slider 70 will move along the resistance helix.

To assist the tension spring 52 I desirably bend the end 72 of arm 69 to span the space between radial arms 54, 55. Both springs 52 and 72 maintain the radial arms in impositive contact with the fork edges and thus eliminate lost motion or backlash in the transmission of pressure from the fork to the contact carrier.

As best shown in Figs. 8 and 9, the slider terminal 30 is connected by means of the spring arms or brushes 71 to the grooved slip ring 74 mounted on the end face of dielectric ring 60. Slip ring 74 is connected by means of contact arm 73 and insulated wire 75 to the rivet 76 by which the contact slider arm 69 is mounted on radial arm 55 of the split nut. Accordingly, a circuit is completed from terminal 30 to contact slider 70.

Figure 21:
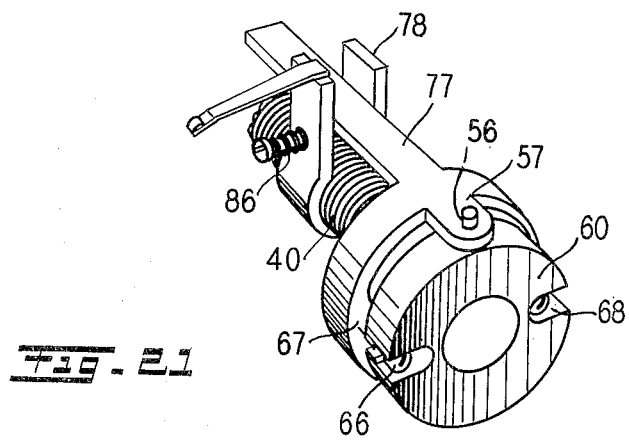
Fig. 21 is a fragmentary perspective view illustrating a modified driver fork.
Figure 22:
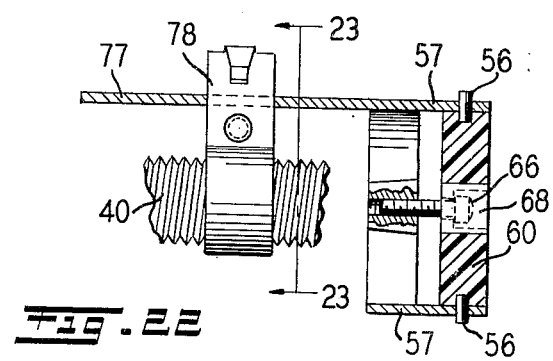
Fig. 22 is a fragmentary side elevation, partly in section, of the device of Fig. 21.
Figure 23:
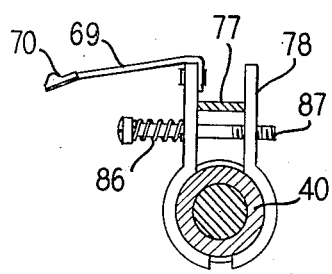
Fig. 23 is a cross sectional view on the line 23—23 of Fig. 22.

A modified embodiment of the driver fork is shown in Figs. 21–23. Here the driver ring 60 has radial pins 56 to which arms 57 of the driver yoke are pivoted. The fork in this embodiment of the invention comprises a single arm 77 and the radial arms 78 of the split nut embrace the arm 77 under tension of spring 86 coiled about screw 87. The other parts are substantially identical to those previously described and are given the same reference characters. Spring 86 prevents backlash and screws 66 may be adjusted to cant the arm 77 with respect to the drive shaft axis.

As shown in Figs. 6 and 7, the slot may be curved in the manner explained in my prior patent aforesaid to correct for loading error, etc.

The provision for the oscillatable fork is particularly useful where manufacturing tolerances are such that rotation of the shaft 41 through exactly 3600° (for a ten-turn-potentiometer) does not exactly position the contact slider 70 at the point on the resistance helix to which its end terminal is connected. Manufacturing tolerances are such that there will normally be only a very few degrees difference. Such difference as there is, however, can be compensated for by adjusting the screws 66 to slightly advance or retard rotation of the contact carrier with respect to the rotation of the drive shaft and hence position the slider 70 accurately with respect to the helix terminal.

Figure 2:
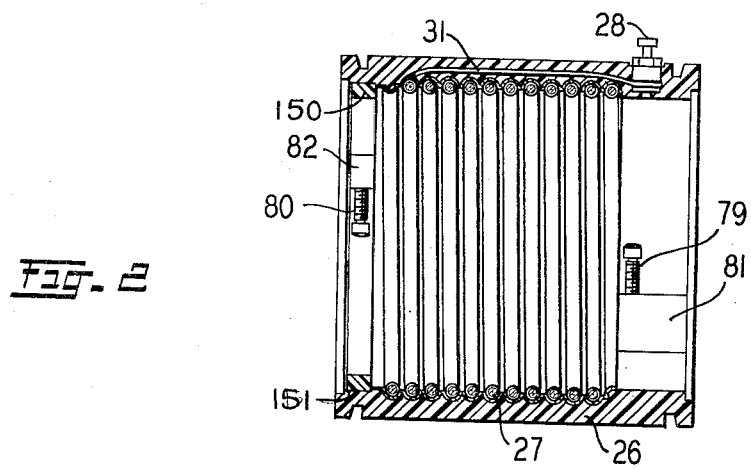
Fig. 2 is an axial cross section in a different plane taken through the housing shell and resistance helix only.

I also provide adjustable stops to arrest the movement of the contact carrier at both ends of its traverse of the resistance helix. As best shown in Figs. 2, 8 and 9, these stops comprise headed screws 79, 80 which are adjustably mounted in the lugs 81, 82 molded on the interior wall of the housing shell 26. The radial arms 54, 55 of the split nut have at their outer extremities axially extending abutments 83, 84 which respectively engage the screws 80, 79 at the end of contact carrier travel. Note that the respective screws contact axially projecting abutments on the trailing arm which is backed up by positive contact with the trailing edge of the fork slot 59. Accordingly, the stop reacts positively with the contact carrier and driver to arrest rotation thereof without backlash.

As best shown in Fig. 2, stop mounting lug 82 is mounted on ring 150. In the course of its initial positioning ring 150 may be rotatably adjusted on its seat 151 in housing shell 26 to its position shown in Fig. 2 in which screw 80 engages contact carrier abutment 83 after 3600° mechanical rotation of the carrier. Overtravel of the contact carrier may be provided by rotating ring 150 to arcuately displace lug 82 and screw 80 for more than 3600° mechanical rotation of the carrier. After ring 150 is properly adjusted to meet the potentiometer specification as to mechanical rotation, it may be permanently cemented to its seat 151.

As shown in Figs. 8 and 9, the housing shell is provided with a lug 85 diametrically opposite lug 81. Lugs 81, 85 provide end faces against which potentiometer end closure 152 is mounted.

The adjustability of screws 79, 80 in their threaded lugs 81, 82 provides for adjusting the index points with respect to which the contact carrier is phased to the resistance helix. It is rarely possible in a production manufacturing operation to provide in each potentiometer fixed stops which will invariably engage the contact carrier when the contact slider is exactly over the end terminal of the resistance helix. By making the end stops adjustable within the manufacturing tolerances of the potentiometer, however these tolerances can be discounted and the stops subsequently adjusted to a position where the contact slider will register exactly with the end terminal of the resistance helix.

Either end stop may be used as an indexing point, although conventionally the counterclockwise stop is used for indexing purposes. In a case where the potentiometer is adjusted for absolute terminal linearity the stops 79, 80 are adjusted for exactly 3600° mechanical rotation of the shaft and the fork 59 is adjusted so that the contact slider has exactly 3600° electrical rotation.

In the device of the present invention it is relatively simple to gang potentiometers as shown in Fig. 14. As shown in this view multiple potentiometer housing shells 88, 89 and 90 are connected in end-to-end relation by my novel clamping rings 43 aforesaid. A single drive shaft 91 extends through the aligned hollow lead screws 92, 93, 94 of the respective potentiometers, the respective driver bands 95, 96, 97 being clamped thereto by the set screws aforesaid. In assembling the potentiometers and phasing the respective contact carriers with respect to their respective resistance helices the drivers are all clamped by their set screws to the common shaft. The respective potentiometer housing shells are then sequentially rotated, starting with the shell nearest the mounting panel, to position their respective resistance helices in desired phased relationship to the contact sliders. As each housing shell is phased it is permanently clamped to its support. Shell 88 is clamped in adjusted position to end closure 38 and shells 89 and 90 are respectively clamped to their next preceding housing shells, 88 and 89 respectively. Where potentiometers are ganged only a single set of stops, desirably those in the potentiometer housing shell mounted nearest the panel, are used to limit the mechanical rotation of the shaft. Notwithstanding the ganging aforesaid, each potentiometer may be phased to respond to any linearity definition.

The novel form of my clamping ring is best shown in Figs. 10 through 12. Each ring 42 is generally channel-shaped in cross section and is provided with divergent or tapered flanges 100. Adjacent housing shells 88, 89 (Fig. 12) are provided near their ends with peripheral grooves 102 which define end flanges 103 which have one wall 104 tapered complementary to the taper of the flanges 100 of the clamping ring 43. Accordingly, when the ring is contracted it will function in the manner of a wedge to apply axial pressure clamping the respective shells together in end abutment.

Each clamping ring 43 has its ends 106, 107 respectively provided with a buckle bar 108 and a strap 109 of reduced width which may be threaded through the apertures 105, beneath the buckle bar 108 and bent back about the bar 108, as shown in Fig. 11, and soldered at 112. At a point diametrically opposite the clamping strap 109 the web 43 of the ring is provided with an inwardly projecting radial peg 113.

In the course of phasing the respective shells temporary clamps are used to hold the shells in adjusted ganged relation. Each temporary clamp is desirably provided with a boring jig radially aligned with the shell junction in which a drill may be guided to concurrently notch both flanges 103 of both shells and thus provide a peg socket 114 (Fig. 18) into which the peg 113 will seat to key adjacent housing shells in phased alignment when they are axially clamped. Thereupon the clamp ring 43 may be tightened by tensioning the strap 109 and welding it as aforesaid. During contraction the tapered flanges 100 of the clamp ring exert axial tightening pressure on the shells as aforesaid.

Note from Fig. 12 that grooves 102 are deeper than the flanges are wide and that there is a clearance space indicated by reference character 115 between the periphery of the flanges 103 and the web 43 of the ring to provide for radial movement of the clamp during its contraction.

Where potentiometers are ganged as shown in Fig. 14, the lead screws 93, 94 in the housing shells remote from the panel mounted shell are provided with integral end disks 116, 117 which are seated as shown in Fig. 12 in suitable grooves 118 formed on the inner mating edges of the respective housing shells. Accordingly, each lead screw is rigidly supported on the common axis of the resistance helices. A lateral key 110 seated in a groove 111 in the disk edge locks the lead screws in fixed position.

Figs. 15 through 17 show various bearing and support structure for the drive shaft and means for mounting the potentiometers from a panel. Fig. 15 shows how an end closure 121 may be secured by the screws 122 to an end disk 123 which has an externally threaded hub 124 which may be received through an aperture 125 in the panel wall 126. A washer 127, nut 128 and lock nut 129 are provided to securely clamp the hub and disk 123 to the panel.

The end closure 121 may be provided with a bearing cavity 132 which seats a bearing bushing 133 which has an annular flange 134 seating in a complementary annular groove in the hub 124 of the disk 123. Bearing bushing 133 mounts one end of drive shaft 135.

Fig. 16 shows how the potentiometer may be mounted from its end opposite the closure with which the lead screw is integral. Here the structure is a substantial duplicate of that shown in Fig. 15 except that the end of lead screw 136 remote from front end closure 121 is not integral with the rear end closure 137, all other parts being substantially identical.

Fig. 17 shows a construction in which the end closure 138 in a single or ganged series of potentiometers may be provided with a countersunk aperture 139 to receive the ball bearing 142 in which the end of shaft 135 is rotatably supported. This is an alternative construction to that shown in Fig. 1 in which the bushing 47 in the end of the lead screw supports the rear end of the shaft.

I claim:

1. In a multi-turn potentiometer adapted to be mounted on a panel and having a housing shell, a resistance helix mounted in said shell, a contact slider having a helical path of movement along said helix and a contact carrier, a lead screw coaxial with said helix and having threads engaged with said contact carrier whereby rotation of the contact carrier on said lead screw will move the contact slider along the resistance helix, an end closure for the said housing which is integral with the lead screw and means for connecting said closure to said housing shell and directly to said panel whereby said lead screw is rigid and coaxial with respect to the resistance helix.

2. In a multi-turn potentiometer having a housing shell, a resistance helix mounted in said shell, a contact slider having a helical path of movement along said helix and a contact carrier, a lead screw coaxial with said helix and having threads engaged with said contact carrier whereby rotation of the contact carrier on said lead screw will move the contact slider along the resistance helix, an end closure for the said housing shell which is integral with the lead screw and means for connecting said closure to said housing shell, in which said lead screw comprising a hollow tube, a shaft in said tube and means at the end of the lead screw remote from said closure connecting said shaft to said contact carrier for transmission of rotary movement to said contact slider from said shaft.

3. In a multi-turn potentiometer having a resistance helix, a contact slider having a helical path of movement therealong, a contact carrier, a driver for moving said contact carrier coaxially with respect to the resistance helix, said driver comprising a support, a contact carrier guide and means adjustably mounting said guide on the support at selectively different angles to the axis of the resistance helix whereby the angle of rotation of the contact slider will be selectively different from the angle of rotation of the driver.

4. In a multi-turn potentiometer having a resistance helix, a contact slider having a helical path of movement therealong, a contact carrier, a driver for moving said contact carrier coaxially with respect to the resistance helix, said driver comprising a support and a contact carrier guide mounted on the support at an angle to the axis of the resistance helix whereby the angle of rotation of the contact slider will be different from the angle of rotation of the driver, said support and guide being pivotally connected, together with means for adjusting said guide about said pivot.

5. The device of claim 4 in which said support has an arcuate seat, said guide being provided with an arcuate fulcrum oscillatable in said seat, said guide being further provided with laterally extending wings and adjusting screws connecting said wings with said support for oscillating the guide in its seat.

6. The device of claim 5 in which said potentiometer is provided with a fixed lead screw coaxial with its resistance helix, said contact carrier comprising a split nut engaged with said screw and having generally radially extending arms, said contact carrier guide comprising a plate spaced between the screw and resistance helix and having a longitudinal slot embracing the said arms, and means biasing said arms apart for tensioned engagement with opposite edges of the slot.

7. The device of claim 6 in which the slot margins are correspondingly curved, said curved margins comprising means for altering the linearity response of the potentiometer.

8. The device of claim 6 in further combination with a housing shell in which said resistance helix is mounted, said housing shell being provided with stop abutments disposed proximate the ends of said helix, said radial arms having axially extending projections respectively engaging said abutments at the ends of contact carrier travel.

9. The device of claim 8 in which the projection on the radial arm which trails in the direction of carrier rotation engages the abutment at the end of carrier rotation to positively transmit stop pressure to the edge of the slot with which said arm is engaged.

10. In a potentiometer of the character described including a resistance helix having end terminals, a coaxial lead screw, a contact slider movable on a helical path along the resistance helix, a contact carrier threaded to said screw and means for driving said carrier on said screw to move the slider along the helix, means for phasing the contact carrier with respect to the end terminals of the resistance helix, said means comprising stops at both ends of the helical travel of the contact carrier, and means for adjusting the position of one of said stops whereby when the contact carrier is against said stop its contact slider is engaged with the resistance helix opposite one end terminal thereof.

11. The device of claim 10 in which the other said stop is provided with means for adjusting its position to abut the contact carrier after it has rotated through a predetermined angle with respect to the said one stop.

12. The device of claim 11 in which said other stop is adjusted to abut the contact carrier when its contact slider is engaged with the resistance helix opposite its other end terminal.

13. The device of claim 11 in which the means for driving the contact carrier along the helix comprises a guide arm mounted at an angle to the axis of the resistance helix, whereby the angle of rotation of the contact slider will be different from the angle of rotation of the driving means and whereby the position of the guide arm may be changed to provide for engagement of the contact slider with the resistance helix opposite its other end terminal after the driving means has rotated through a predetermined angle between stops and regardless of potentiometer manufacturing tolerances.

14. A plurality of ganged potentiometers of the character described in end-to-end relation, said potentiometers respectively comprising housing shells with resistance helices fixedly mounted therein, hollow lead screws mounted in fixed coaxial relation to the respective helices, a common shaft extending coaxially through said hollow screws, contact carriers threadedly mounted on the respective screws, said carriers having contact sliders engaged with the said helices, drivers for the respective contact carriers and means for fixedly connecting the respective drivers to the said shaft whereby said drivers are turned simultaneously by said shaft, and means for connecting said housing shells together in adjusted position with respect to their respective contact sliders whereby the respective contact sliders move over their respective resistance helices in predetermined phased relation.

15. The device of claim 14 in which the respective drivers comprise guide arms mounted at an angle to the axis of the resistance helices whereby the angle of rotation of the respective contact sliders will be different from the angles of rotation of the respective drivers, the respective guide arms being adjustable with respect to the drive shaft axis whereby the position of the contact slider of each potentiometer with respect to the end terminal of its resistance helix may be optionally changed and to provide for engagement of the contact slider with its resistance helix opposite an end terminal thereof after the driver has rotated through a predetermined angle and regardless of potentiometer manufacturing tolerances.

16. The device of claim 14 in which said housing shells are provided with clamping rings at the junctions thereof and with locking keys spanning said junctions whereby to key said housing shells together in finally adjusted position.

17. The device of claim 16 in which said clamping ring comprises channels having mutually tapering flanges, the ends of said housing shells being provided with correspondingly tapered flanges engaged with the tapered flanges of the clamping rings whereby contraction of the rings imposes axial clamping pressure on adjacent housing shells.

18. The device of claim 14 in which an end potentiometer in said plurality has its lead screw mounted integrally with an end closure, said end closure being provided with means for mounting the entire set of ganged potentiometers from a panel wall, the lead screws of the other potentiometers of said plurality being integrally provided with end disks clamped in rigid position at the junction of their respective potentiometer housing shells.

19. In a device of the character described, the combination with a lead screw, a driver mounted for rotation about the axis of the lead screw and a split nut mounted on the screw and comprising separable sections, each said section being provided with a substantially radial arm, said driver having a guide arm with a longitudinal slot embracing the radial arms of the split nut, said split nut being provided with spring means for biasing said arms apart and into engagement with the edges of the slot whereby to eliminate lost motion in the rotation of the nut under pressure of the driver.

20. The device of claim 19 in which otherwise free end portions of the split nut remote from said radial arms are provided with a connecting tie rod, said spring means comprising a coil spring about said tie rod.

21. The device of claim 19 in which said spring is disposed between said radially projecting arms and biases said arms apart and into engagement with the slot edges.

22. The device of claim 21 in which said nut comprises a contact slider carrier, one of said arms being provided with a contact slider and contact slider arm, a portion of said contact slider arm being disposed between said arms to constitute said spring.

References Cited in the file of this patent
UNITED STATES PATENTS

| | | |
|---|---|---|
| 1,606,153 | Douglas | Nov. 9, 1926 |
| 2,543,228 | Burgess | Feb. 27, 1951 |
| 2,592,392 | Canziani et al. | Apr. 8, 1952 |
| 2,665,355 | Van Alen et al. | Jan. 5, 1954 |
| 2,669,634 | Daily et al. | Feb. 16, 1954 |